US012570928B2

(12) United States Patent
Kropf et al.

(10) Patent No.: US 12,570,928 B2
(45) Date of Patent: Mar. 10, 2026

(54) CHITOSAN DERIVATIVES AS SOIL RELEASE AGENTS

(71) Applicant: Henkel AG & Co. KGaA, Duesseldorf (DE)

(72) Inventors: Christian Kropf, Hilden (DE); Antje Gebert-Schwarzwaelder, Neuss (DE); Christa Junkes, Duesseldorf (DE); Laura Falenski, Neuss (DE); Thomas Heinze, Jena (DE); Lars Gabriel, Berga/Elster (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 724 days.

(21) Appl. No.: 17/881,521

(22) Filed: Aug. 4, 2022

(65) Prior Publication Data

US 2022/0389351 A1 Dec. 8, 2022

Related U.S. Application Data

(63) Continuation of application No. PCT/EP2021/051658, filed on Jan. 26, 2021.

(30) Foreign Application Priority Data

Feb. 4, 2020 (DE) ......................... 102020201317.9

(51) Int. Cl.
*C11D 3/00* (2006.01)
*C11D 3/22* (2006.01)
*C11D 3/34* (2006.01)

(52) U.S. Cl.
CPC .............. *C11D 3/349* (2013.01); *C11D 3/001* (2013.01); *C11D 3/0036* (2013.01); *C11D 2111/12* (2024.01)

(58) Field of Classification Search
None
See application file for complete search history.

(56) References Cited

U.S. PATENT DOCUMENTS

| | | | | |
|---|---|---|---|---|
| 4,000,093 A | 12/1976 | Nicol et al. | | |
| 4,136,038 A | 1/1979 | Pracht et al. | | |
| 6,908,608 B1 * | 6/2005 | Huglin | C11D 3/28 | 424/59 |
| 2004/0235700 A1 * | 11/2004 | Legrand | A61Q 5/08 | 510/302 |
| 2007/0163055 A1 | 7/2007 | Delplancke et al. | | |
| 2009/0062171 A1 * | 3/2009 | Song | C11D 3/40 | 510/276 |
| 2009/0318324 A1 | 12/2009 | Gibbs et al. | | |
| 2011/0319310 A1 | 12/2011 | Labeque | | |
| 2021/0237020 A1 * | 8/2021 | Bachawala | A23L 27/72 | |

FOREIGN PATENT DOCUMENTS

| | | | | |
|---|---|---|---|---|
| CN | 108753470 A * | 11/2018 | C11D 1/00 | |
| DE | 102018210012 A1 | 12/2019 | | |
| EP | 0213729 A1 | 3/1987 | | |
| EP | 0213730 A1 | 3/1987 | | |
| EP | 0628655 A1 | 12/1994 | | |
| EP | 0903402 A1 | 3/1999 | | |
| WO | 03040279 A1 | 5/2003 | | |
| WO | 2006117056 A1 | 11/2006 | | |
| WO | 2019243108 A1 | 12/2019 | | |

OTHER PUBLICATIONS

German Search Report DE 10 2020 201 317.9 Completed: Jan. 13, 2021; Mailing Date: Jan. 13, 2021 6 Pages.
International Search Report PCT/EP2021/051658 Completed: Apr. 30, 2021; Mailing Date: May 14, 2021 4 Pages.
Baumann, H. et al., "Concepts for improved regioselective placement of O-sulfo, N-sulfo, N-acetyl, and N-carboxymethyl groups in chitosan derivatives", Carbohydrate Research (2001), pp. 43-57.
Pestov, A.V. et al., "Synthesis in a Gel and Sorption Properties of N-2-Sulfoethyl Chitosan", ISSN 1070-4272, Russian Journal of Applied Chemistry (2013), vol. 86, No. 2, pp. 269-272.
Petrova, Yu. S. et al., "Chemical Properties of N-2-Sulfoethylchitosan with a Medium Degree of Substitution", ISSN 1560-0904, Polymer Science, Ser. B, 2014, vol. 56, No. 4, pp. 487-493.

* cited by examiner

*Primary Examiner* — Lorna M Douyon
(74) *Attorney, Agent, or Firm* — Bojuan Deng

(57) ABSTRACT

The invention aims to improve the cleaning performance of washing agents when washing textiles. This was substantially achieved by the use of N-carboxy-sulfoalkylated or N-sulfoalkylated chitosan.

15 Claims, No Drawings

CHITOSAN DERIVATIVES AS SOIL RELEASE AGENTS

FIELD OF THE INVENTION

The present invention relates to the use of specific active ingredients which allow the removal of dirt for enhancing the cleaning performance of washing agents when washing textiles.

BACKGROUND OF THE INVENTION

In addition to the ingredients such as surfactants and builder materials that are essential to the washing process, washing agents generally contain further constituents which can be referred to collectively by the term washing aids and comprise the very different active ingredient groups such as foam regulators, graying inhibitors, bleaching agents, bleach activators and dye transfer inhibitors. Such auxiliary substances also include substances which impart dirt-repellent properties to the laundry fibers and which, if present during the washing process, support the ability of the other washing agent components to remove dirt. The same applies, mutatis mutandis, to cleaning agents for hard surfaces. Such substances which allow the removal of dirt are often referred to as soil-release active ingredients or as soil repellents since they are capable of making the treated surface, for example the fibers, repellent to dirt. For example, the dirt-removing effect of methyl cellulose is known from U.S. Pat. No. 4,136,038. European patent application EP 0 213 729 discloses reduced redeposition when washing agents containing a combination of soap and non-ionic surfactant with alkyl hydroxyalkyl cellulose are used. European patent application EP 0 213 730 discloses textile treatment agents which contain cationic surfactants and non-ionic cellulose ethers having HLB values of from 3.1 to 3.8. U.S. Pat. No. 4,000,093 discloses washing agents which contain from 0.1 wt. % to 3 wt. % alkyl cellulose, hydroxyalkyl cellulose or alkyl hydroxyalkyl cellulose, and from 5 wt. % to 50 wt. % surfactant, the surfactant component consisting substantially of $C_{10}$ to $C_{13}$ alkyl sulfate and up to 5 wt. % $C_{14}$ alkyl sulfate and less than 5 wt. % alkyl sulfate having alkyl functional groups of $C_{15}$ and higher. In individual cases, however, it is observed that the effect of such cellulose derivatives in water-containing liquid washing agents can deteriorate after in particular prolonged storage under unfavorable conditions.

Because of their chemical similarity to polyester fibers in textiles made from this material, particularly effective active ingredients which allow the removal of dirt are copolyesters containing dicarboxylic acid units such as terephthalic acid or sulfoisophthalic acid, alkylene glycol units such as ethylene glycol or propylene glycol and polyalkylene glycol units such as polyethylene glycol. Such copolyesters which allow the removal of dirt and the use thereof in washing agents have long been known.

The polymers known from the prior art have the disadvantage that they are not effective or are only inadequately effective, in particular in the case of textiles which do not consist, or at least do not predominantly consist, of polyester. However, many modern textiles consist of cotton or cotton-polyester blended fabrics, and therefore there is a need for active ingredients allowing the removal of dirt that are more effective in particular in the case of fatty stains on textiles of this type in particular.

International patent application WO 2019/243108 A1 discloses the use of N,O-substituted chitosans for enhancing the cleaning performance of washing agents.

BRIEF SUMMARY OF THE INVENTION

Surprisingly, it has been found that chitosan derivatives which only have substituents on the N atom of the chitosan anhydroglucoside ring are superior to the already known N,O-substituted chitosans.

The invention relates to the use of chitosan derivatives containing a modified anhydroglucoside unit of general formula (I),

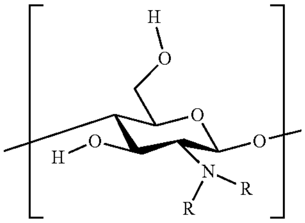

(I)

where the functional groups R represent, independently of one another, —H, $—(CH_2)_nCOOH$, $—(CH_2)_nCOO^-X^+$, $—(CH_2)_mSO_3H$ or $—(CH_2)_mSO_3^-X^+$, n and m represent, independently of one another, numbers from 1 to 3, preferably n represents 1 and/or m represents 2, and $X^+$ represents a charge-balancing cation, in particular an alkali metal ion such as sodium or potassium and/or an ammonium ion, at least some of the functional groups R not representing —H, for enhancing the cleaning performance of washing agents when washing textiles.

Chitosan derivatives of general formula (I) are obtainable by means of reductive amination of ω-oxocarboxylic acids (where $R=—(CH_2)_nCOOH$, $—(CH_2)_nCOO^-X^+$) with chitosan or by means of reacting chitosan with ω-haloalkanesulfonic acids (where $R=—(CH_2)_mSO_3H$, $—(CH_2)_mSO_3^-X^+$), as described, for example, in H. Baumann and V. Faust: "Concepts for improved regioselective placement of O-sulfo, N-sulfo, N-acetyl, and N-carboxymethyl groups in chitosan derivatives," Carbohydr. Res., 331 (2001), 43-57; in A. V. Pestov, Y. S. Petrova, A. V. Bukharova, L. K. Neudachina, 0. V. Koryakova, E. G. Matochkina, and Yu. G. Yatluk: "Synthesis in a gel and sorption properties of N-2-sulfoethyl chitosan," Russ. J. Appl. Chem., 86 (2013), 269-272; and in Yu. S. Petrova, A. V. Bukharova, L. K. Neudachina, L. V. Adamova, 0. V. Koryakova and A. V. Pestov: "Chemical properties of N-2-Sulfoethylchitosan with a medium degree of substitution," Polym. Sci. Ser. B, 56 (2014), 487-493.

The average degree of substitution (DS) in the chitosan derivative to be used according to the invention is preferably in the range of from 0.1 to 1.0, in particular from 0.2 to 0.9, based on the proportion of functional groups $—NR_2$ which are not $—NH_2$. The average degree of polymerization (DPn) in the chitosan used for the preparation of the chitosan derivative to be used according to the invention is preferably in the range of from 100 to 1,200, preferably in the range of from 200 to 800. Of the chitosan derivatives to be used according to the invention, those having a number-average molar mass in the range of from 5,000 g/mol to 150,000 g/mol, in particular in the range of from 30,000 g/mol to 110,000 g/mol, to be determined for example by means of size-exclusion chromatography (GPC, for example eluent 0.08 M $Na_2HPO_4$, flow rate 1 ml/min, JASCO® system, pump: PU-980, detector: RI-2031 Plus, column: PSS Novema 1,000 and PSS Novema 30 in series) and Pullulan as calibration standard, are preferred.

The chitosan derivative preferably has no further units than those of general formula (I).

The invention also relates to a method for washing textiles, in which a washing agent and an active ingredient which allows the removal of dirt in the form of a chitosan derivative as defined above are used. These methods can be carried out manually or optionally using a conventional domestic washing machine. It is possible to simultaneously or sequentially use the washing agent and the active ingredient which allows the removal of dirt. The simultaneous application can be carried out particularly advantageously by the use of a washing agent containing the active ingredient which allows the removal of dirt. The method substantially consists in bringing a textile in need of cleaning or at least the soiled part of its surface into contact with an aqueous preparation containing the chitosan derivative defined above. The aqueous preparation is left to act on the textile or at least the soiled part of its surface for a certain time and the aqueous preparation is then removed, for example by rinsing the textile with water.

The effect of the active ingredient to be used according to the invention is particularly pronounced when used repeatedly, i.e., in particular for removing soiling from textiles which have already been washed and/or post-treated in the presence of the active ingredient before they were soiled. With regard to the post-treatment, it should be noted that the positive aspect described can also be produced by a washing method in which the textile is brought into contact with a post-treatment agent in the presence of water, for example in the context of a fabric softening step which contains an active ingredient to be used according to the invention, after the actual washing process, which can be carried out using a washing agent that may contain an active ingredient mentioned, but may also be free thereof in this case. In this procedure, too, the washing performance-enhancing effect of the active ingredients to be used according to the invention occurs during the next washing process, even if, if desired, a washing agent without an active ingredient to be used according to the invention is used. This effect is significantly higher than that resulting from the use of a conventional soil-release active ingredient. In a particularly preferred embodiment, the active ingredient that is essential to the invention is added in the fabric softening cycle of the in particular automatic textile wash.

The active ingredient used according to the invention leads to significantly better separation of in particular fat and cosmetic soiling on textiles, in particular textiles made of cotton or a cotton-containing fabric, as is the case when using compounds previously known for this purpose. Alternatively, significant amounts of surfactants can be saved while retaining the ability to remove fat.

In addition, it was observed that when the cellulose derivatives which are essential to the invention are present in the washing process, there is less redeposition of dirt that has already been detached from the textile on the cleaned textile, and therefore the textiles washed in the presence of a chitosan derivative essential to the invention gray significantly less than those washed in the absence of the chitosan derivative essential to the invention. The invention therefore further relates to the use of the chitosan derivatives defined above for reducing graying of textiles, in particular textiles which are made of cotton or contain cotton, during washing.

The uses according to the invention can be carried out in the context of a washing process in such a way that the active ingredient which allows the removal of dirt is added to a washing agent-containing liquor or preferably the active ingredient is introduced as a constituent of a washing agent into the liquor which contains the object to be cleaned or which is brought into contact therewith.

The use according to the invention in the context of a laundry post-treatment method can accordingly take place in such a way that the active ingredient which allows the removal of dirt is added separately to the rinsing liquor, which is used after the washing cycle using a washing agent, or it is introduced as a constituent of the laundry post-treatment agent, in particular a fabric softener. In this aspect of the invention, the washing agent used before the laundry post-treatment agent may also contain an active ingredient to be used according to the invention, but may also be free therefrom.

The invention therefore also relates to washing agents and laundry post-treatment agents which contain chitosan derivatives as defined above.

DETAILED DESCRIPTION OF THE INVENTION

The washing process is carried out preferably at a temperature of from 15° C. to 60° C., particularly preferably at a temperature of from 20° C. to 40° C. Moreover, the washing process is carried out preferably at a pH of from 6 to 11, particularly preferably at a pH of from 7.5 to 9.5. The use concentration of the chitosan derivative in the washing liquor is preferably from 0.0001 g/l to 1 g/l, in particular 0.001 g/l to 0.2 g/l.

Washing agents which contain or are used together with an active substance to be used according to the invention in the form of the mentioned chitosan derivative or are used in the method according to the invention may contain all other conventional constituents of such agents which do not interact in an undesired manner with the active ingredient essential to the invention, in particular the surfactant. Preferably, the active ingredient as defined above is used in amounts of from 0.01 wt. % to 10 wt. %, particularly preferably from 0.1 wt. % to 3 wt. %, these stated amounts and those in the following relating to the total agent, unless otherwise stated. An agent according to the invention or used in the method according to the invention or used in the context of the use according to the invention is preferably water-containing and liquid; it contains in particular 2 wt. % to 92 wt. %, particularly preferably 3 wt. % to 85 wt. %, water.

Surprisingly, it has been found that the active ingredient used according to the invention has a positive influence on the effect of other specific washing agent ingredients and that, conversely, the effect of the soil-release active ingredient is additionally enhanced by specific other washing agent ingredients. These effects occur in particular with bleaching agents, with enzymatic active ingredients, in particular proteases and lipases, with water-soluble inorganic and/or organic builders, in particular based on oxidized carbohydrate or polymeric polycarboxylates, with synthetic sulfate-type and sulfonate-type anionic surfactants, and with dye transfer inhibitors, for example vinylpyrrolidone, vinylpyridine or vinylimidazole polymers or copolymers or corresponding polybetaines, as a result of which the use of at least one of the mentioned further ingredients together with the active ingredient to be used according to the invention is preferred.

An agent which contains or is used together with an active ingredient to be used according to the invention or is used in the method according to the invention preferably contains peroxygen-based bleaching agents, in particular in amounts in the range of from 3 wt. % to 70 wt. %, and optionally bleach activators, in particular in amounts of from 0.5 wt. % to 10 wt. %; however, in another preferred embodiment, this agent may be free of bleaching agents and bleach activators. The bleaching agents in question are preferably the peroxygen compounds generally used in washing agents, such as percarboxylic acids, for example dodecanedioic acid or phthaloylaminoperoxicaproic acid, hydrogen peroxide, alkali metal perborate, which may be in the form of tetra- or monohydrate, percarbonate, perpyrophosphate and persilicate, which are generally used as alkali metal salts, in particular as sodium salts. Such bleaching agents are present in washing agents containing an active ingredient used according to the invention preferably in amounts of up to 25 wt. %, in particular up to 15 wt. % and particularly preferably from 3 wt. % to 15 wt. %, in each case based on the total agent, in particular percarbonate being used. The optionally present component of the bleach activators comprises the commonly used N- or O-acyl compounds, for example polyacylated alkylenediamines, in particular tetraacetylethylenediamine, acylated glycolurils, in particular tetraacetylglycoluril, N-acylated hydantoins, hydrazides, triazoles, urazoles, diketopiperazines, sulfurylamides and cyanurates, and carboxylic acid anhydrides, in particular phthalic acid anhydride, carboxylic acid esters, in particular sodium isononanoyl phenolsulfonate, and acylated sugar derivatives, in particular pentaacetylglucose, and cationic nitrile derivatives such as trimethylammonium acetonitrile salts. The bleach activators may have been coated or granulated in a known manner with coating substances during storage in order to avoid interaction with the peroxygen compounds, with tetraacetylethylenediamine having a weight-average particle size of from 0.01 mm to 0.8 mm, granulated using carboxymethylcellulose, granulated 1,5-diacetyl-2,4-dioxohexahydro-1,3,5-triazine and/or trialkylammonium acetonitrile in particulate form being particularly preferred. Such bleach activators are preferably contained in washing agents in amounts of up to 8 wt. %, in particular from 0.5 wt. % to 6 wt. %, in each case based on the total agent.

In another embodiment, an agent used according to the invention or used in the method according to the invention contains non-ionic surfactant, selected from fatty alkyl polyglycosides, fatty alkyl polyalkoxylates, in particular ethoxylates and/or propoxylates, fatty acid polyhydroxyamides and/or ethoxylation products and/or propoxylation products of fatty alkylamines, vicinal diols, fatty acid alkyl esters and/or fatty acid amides and mixtures thereof, in particular in an amount in the range of from 2 wt. % to 25 wt. %.

Another embodiment of such agents comprises the presence of synthetic sulfate-type or sulfonate-type anionic surfactant, in particular fatty alkyl sulfate, fatty alkyl ether sulfate, sulfo fatty acid ester and/or sulfo fatty acid di-salts, in particular in an amount in the range of from 2 wt. % to 25 wt. %. The anionic surfactant is preferably selected from the alkyl or alkenyl sulfates and/or the alkyl or alkenyl ether sulfates of which the alkyl or alkenyl group has 8 to 22, in particular 12 to 18, C atoms. These are usually not individual substances, but cuts or mixtures. Of these, preference is given to those of which the content of compounds having longer-chain functional groups in the range of from 16 to 18 C atoms is more than 20 wt. %.

Suitable non-ionic surfactants include the alkoxylates, in particular the ethoxylates and/or propoxylates, of saturated or mono- to polyunsaturated linear or branched-chain alcohols having 10 to 22 C atoms, preferably 12 to 18 C atoms. The degree of alkoxylation of the alcohols is generally between 1 and 20 and preferably between 3 and 10. They may be produced in a known manner by reacting the corresponding alcohols with the corresponding alkylene oxides. Particularly suitable are the derivatives of fatty alcohols, although their branched-chain isomers, in particular so-called oxo alcohols, can be used for the preparation of usable alkoxylates. Accordingly, the alkoxylates, in particular the ethoxylates, of primary alcohols having linear, in particular dodecyl, tetradecyl, hexadecyl or octadecyl, functional groups and mixtures thereof can be used. In addition, suitable alkoxylation products of alkylamines, vicinal diols and carboxylic acid amides, which correspond to said alcohols with respect to the alkyl part, are usable. In addition, the ethylene oxide and/or propylene oxide insertion products of fatty acid alkyl esters and fatty acid polyhydroxyamides can be considered. So-called alkylpolyglycosides which are suitable for incorporation in the agents according to the invention are compounds of the general formula $(G)_n$—$OR^{12}$, where $R^{12}$ denotes an alkyl or alkenyl functional group having 8 to 22 C atoms, G denotes a glycose unit and n denotes a number between 1 and 10. The glycoside components $(G)_n$ are oligomers or polymers of naturally occurring aldose or ketose monomers, including in particular glucose, mannose, fructose, galactose, talose, gulose, altrose, allose, idose, ribose, arabinose, xylose and lyxose. The oligomers consisting of such glycosidically linked monomers are characterized not only by the nature of the sugars contained in them but also by their number, which is referred to as the degree of oligomerization. The degree of oligomerization n generally assumes broken numerical values as the value to be analytically determined; it is in the range of between 1 and 10, with the glycosides that are preferably used being below a value of 1.5, in particular between 1.2 and 1.4. A preferred monomer building block is glucose due to its good availability. The alkyl or alkenyl moiety $R^{12}$ of the glycosides is preferably also derived from readily available derivatives of renewable raw materials, in particular from fatty alcohols, although their branched-chain isomers, in particular so-called oxo alcohols, can be used for the preparation of usable glycosides. In particular the primary alcohols having linear octyl, decyl, dodecyl, tetradecyl, hexadecyl or octadecyl functional groups and the mixtures thereof can therefore be used. Particularly preferred alkyl glycosides contain a coconut oil alkyl functional group, i.e., mixtures where substantially $R^{12}$=dodecyl and $R^{12}$=tetradecyl.

Non-ionic surfactant is used according to the invention in agents which contain a soil-release active ingredient or is used in the method according to the invention, preferably in amounts of from 1 wt. % to 30 wt. %, in particular from 1 wt. % to 25 wt. %, with amounts in the upper part of this range being more likely to be found in liquid washing agents and particulate washing agents preferably containing lower amounts of up to 5 wt. %.

The agents may instead or additionally contain other surfactants, preferably synthetic sulfate-type or sulfonate-type anionic surfactants, such as alkylbenzene sulfonates, in amounts of preferably no more than 20 wt. %, in particular of from 0.1 wt. % to 18 wt. %, in each case based on the total agent. Synthetic anionic surfactants which are particularly suitable for use in such agents are the alkyl and/or alkenyl sulfates having 8 to 22 C atoms which carry an alkali-, ammonium- or alkyl- or hydroxyalkyl-substituted ammonium ion as a countercation. Preference is given to the derivatives of the fatty alcohols having in particular 12 to 18 C atoms and their branched-chain analogs, the so-called oxo alcohols. The alkyl and alkenyl sulfates can be prepared in a known manner by reacting the corresponding alcohol component with a conventional sulfating reagent, in particular sulfur trioxide or chlorosulfonic acid, and subsequent neutralization with alkali-, ammonium- or alkyl- or hydroxyalkyl-substituted ammonium bases. Sulfur-type surfactants which can be used also include the sulfated alkoxylation products of the alcohols mentioned, known as ether sulfates. Such ether sulfates preferably contain from 2 to 30, in particular from 4 to 10, ethylene glycol groups per molecule. Suitable sulfonate-type anionic surfactants include the α-sulfoesters obtainable by reacting fatty acid esters with sulfur trioxide and subsequent neutralization, in particular α-sulfoesters of fatty acids having 8 to 22 C atoms, preferably 12 to 18 C atoms, and linear alcohols having 1 to 6 C atoms, preferably 1 to 4 C atoms, derivative sulfonation products, as well as the sulfo fatty acids resulting therefrom by formal saponification.

Other optional surface-active ingredients include soaps, with saturated fatty acid soaps, such as the salts of lauric acid, myristic acid, palmitic acid or stearic acid, as well as soaps derived from natural fatty acid mixtures, for example coconut, palm kernel or tallow fatty acids, being suitable. In particular, soap mixtures are preferred which are composed of 50 wt. % to 100 wt. % saturated $C_{12}$-$C_{18}$ fatty acid soaps and up to 50 wt. % oleic acid soap. Preferably, soap is contained in amounts of from 0.1 wt. % to 5 wt. %. However, liquid agents containing a polymer used according to the invention can in particular contain higher amounts of soap, usually up to 20 wt. %.

If desired, the agents may also contain betaines and/or cationic surfactants which, if present, are preferably used in amounts of from 0.5 wt. % to 7 wt. %. Among them, the esterquats discussed below are particularly preferred.

In a further embodiment, the agent contains water-soluble and/or water-insoluble builders, in particular selected from alkali metal aluminosilicate, crystalline alkali silicate having a module above 1, monomeric polycarboxylate, polymeric polycarboxylate and mixtures thereof, in particular in amounts in the range of from 2.5 wt. % to 60 wt. %.

The agent preferably contains 20 wt. % to 55 wt. % water-soluble and/or water-insoluble, organic and/or inorganic builder. The water-soluble organic builders include in particular those from the class of the polycarboxylic acids, in particular citric acid and saccharic acids, and the polymeric (poly)carboxylic acids, in particular the polycarboxylates obtainable by oxidation of polysaccharides, polymeric acrylic acids, methacrylic acids, maleic acids and mixed polymers thereof, which may also contain, in the polymer, small portions of polymerizable substances, without a carboxylic acid functionality. The relative molecular mass of the homopolymers of unsaturated carboxylic acids is generally between 5,000 g/mol and 200,000 g/mol, that of the copolymers is between 2,000 g/mol and 200,000 g/mol, preferably 50,000 g/mol to 120,000 g/mol, in each case based on free acid. A particularly preferred acrylic acid-maleic acid copolymer has a relative molecular mass of from 50,000 g/mol to 100,000 g/mol. Compounds of this class which are suitable, although less preferred, are copolymers of acrylic acid or methacrylic acid with vinyl ethers, such as vinyl methyl ethers, vinyl esters, ethylene, propylene, and styrene, in which the proportion of the acid is at least 50 wt. %. It is also possible to use, as water-soluble organic builders, terpolymers which contain two carboxylic acids and/or the salts thereof as monomers and vinyl alcohol and/or a vinyl alcohol derivative or a carbohydrate as the third monomer. The first acid monomer or the salt thereof is derived from a monoethylenically unsaturated $C_3$-$C_8$ carboxylic acid and preferably from a $C_3$-$C_4$ monocarboxylic acid, in particular from (meth)acrylic acid. The second acid monomer or the salt thereof can be a derivative of a $C_4$-$C_8$ dicarboxylic acid, maleic acid being particularly preferred. In this case, the third monomeric unit is formed from vinyl alcohol and/or preferably an esterified vinyl alcohol. In particular, vinyl alcohol derivatives are preferred which are an ester of short-chain carboxylic acids, for example $C_1$-$C_4$ carboxylic acids, with vinyl alcohol. Preferred terpolymers contain from 60 wt. % to 95 wt. %, in particular 70 wt. % to 90 wt. %, (meth)acrylic acid or (meth)acrylate, particularly preferably acrylic acid or acrylate, and maleic acid or maleate, and from 5 wt. % to 40 wt. %, preferably 10 wt. % to 30 wt. %, vinyl alcohol and/or vinyl acetate. Very particularly preferred are terpolymers in which the weight ratio of (meth)acrylic acid or (meth)acrylate to maleic acid or maleate is between 1:1 and 4:1, preferably between 2:1 and 3:1, and in particular between 2:1 and 2.5:1. Both the amounts and the weight ratios are based on the acids. The second acid monomer or the salt thereof can also be a derivative of an allylsulfonic acid which is substituted in the 2 position with an alkyl functional group, preferably with a $C_1$-$C_4$ alkyl functional group, or an aromatic functional group which is preferably derived from benzene or benzene derivatives. Preferred terpolymers contain from 40 wt. % to 60 wt. %, in particular 45 to 55 wt. %, (meth)acrylic acid or (meth)acrylate, particularly preferably acrylic acid or acrylate, from 10 wt. % to 30 wt. %, preferably 15 wt. % to 25 wt. %, methallylsulfonic acid or methallylsulfonate, and from 15 wt. % to 40 wt. %, preferably 20 wt. % to 40 wt. %, of a carbohydrate as the third monomer. This carbohydrate may be, for example, a mono-, di-, oligo- or polysaccharide, mono-, di- or oligosaccharides being preferred, sucrose particularly being preferred. The use of the third monomer presumably incorporates predetermined breaking points into the polymer which are responsible for the good biodegradability of the polymer. These terpolymers generally have a relative molecular mass of between 1,000 g/mol and 200,000 g/mol, preferably between 3,000 g/mol and 10,000 g/mol. The organic builder substances may, in particular for the preparation of liquid agents, be used in the form of aqueous solutions, preferably in the form of 30 to 50 wt. % aqueous solutions. All mentioned polycarboxylic acids are generally used in the form of the water-soluble salts thereof, in particular the alkali salts thereof.

Organic builders of this kind are preferably contained in amounts of up to 40 wt. %, in particular up to 25 wt. %, and particularly preferably from 1 wt. % to 5 wt. %. Amounts close to the stated upper limit are preferably used in pasty or liquid, in particular water-containing, agents.

In particular crystalline or amorphous alkali aluminosilicates are used as water-insoluble, water-dispersible inorganic builder materials in amounts of up to 50 wt. %, preferably no greater than 40 wt. %, and in liquid agents in particular in amounts of from 1 wt. % to 5 wt. %. Among these, the washing agent-grade crystalline aluminosilicates, in particular zeolite NaA and optionally NaX, are preferred. Amounts close to the stated upper limit are preferably used in solid particulate agents. Suitable aluminosilicates have in particular no particles having a particle size greater than 30 mm and preferably consist of at least 80 wt. % of particles having a size smaller than 10 mm. The calcium binding capacity of said aluminosilicates, which can be determined according to the specifications in German patent DE 24 12 837, is generally in the range of from 100 to 200 mg CaO per gram. Suitable substitutes or partial substitutes for the stated aluminosilicate are crystalline alkali silicates, which may be present alone or in a mixture with amorphous silicates. The alkali silicates that can be used in the agents as builders preferably have a molar ratio of alkali oxide to $SiO_2$ of less than 0.95, in particular from 1:1.1 to 1:12, and may be present in amorphous or crystalline form. Preferred alkali silicates are sodium silicates, in particular amorphous sodium silicates, having a molar ratio $Na_2O$: $SiO_2$ of from 1:2 to 1:2.8. Such amorphous alkali silicates are commercially available, for example, under the name Porta®. They are preferably added, in the context of preparation, as a solid and not in the form of a solution. Crystalline phyllosilicates of the general formula $Na_2Si_xO_{2x+1}\cdot yH_2O$, where x, referred to as the module, is a number from 1.9 to 4, y is a number from 0 to 20, and preferred values for x are 2, 3 or 4, are preferably used as crystalline silicates, which may be present alone or in a mixture with amorphous silicates. Preferred crystalline phyllosilicates are those in which x in the stated general formula assumes the values 2 or 3. In particular, both β- and δ-sodium disilicates ($Na_2Si_2O_5\cdot yH_2O$) are preferred. Practically water-free crystalline alkali silicates which have the above general formula, in which x is a number from 1.9 to 2.1, and which are prepared from amorphous alkali silicates may also be used in agents which contain an active ingredient to be used according to the invention. In a further preferred embodiment of agents according to the invention, a crystalline sodium phyllosilicate having a module of from 2 to 3, as can be prepared from sand and soda, is used. Crystalline sodium silicates having a module in the range of from 1.9 to 3.5 are used in a further preferred embodiment of washing agents according to the invention which contain an active ingredient used according to the invention. The content of alkali silicates is preferably from 1 wt. % to 50 wt. % and in particular 5 wt. % to 35 wt. %, based on water-free active substance. If alkali aluminosilicate, in particular zeolite, is present as an additional builder, the content of alkali silicate is preferably from 1 wt. % to 15 wt. % and in particular 2 wt. % to 9 wt. %, based on water-free active substance. The weight ratio of aluminosilicate to silicate, in each case based on water-free active substances, is then preferably 4:1 to 10:1. In agents containing amorphous as well as crystalline alkali silicates, the weight ratio of amorphous alkali silicate to crystalline alkali silicate is preferably 1:2 to 2:1 and in particular 1:1 to 2:1.

In addition to the mentioned inorganic builder, other water-soluble or water-insoluble inorganic substances may be contained in the agents which contain or are used together with an active ingredient to be used according to the invention or are used in the method according to the invention. Suitable in this context are the alkali metal carbonates, alkali metal bicarbonates and alkali metal sulfates as well as mixtures thereof. Such additional inorganic material may be present in amounts of up to 70 wt. %.

In addition, the agents may contain other ingredients that are conventional in washing and cleaning agents. These optional ingredients include, in particular, enzymes, enzyme stabilizers, complexing agents for heavy metals, for example aminopolycarboxylic acids, aminohydroxypolycarboxylic acids, polyphosphonic acids and/or aminopolyphosphonic acids, suds suppressors, for example organopolysiloxanes or paraffins, solvents and optical brighteners, for example stilbene disulfonic acid derivatives. Preferably, agents which contain an active ingredient used according to the invention contain up to 1 wt. %, in particular from 0.01 wt. % to 0.5 wt. %, optical brighteners, in particular compounds from the class of the substituted 4,4'-bis(2,4,6-tri-amino-s-triazinyl)-stilbene-2,2'-disulphonic acids, up to 5 wt. %, in particular from 0.1 wt. % to 2 wt. %, complexing agent for heavy metals, in particular aminoalkylenephosphonic acids and salts thereof, and up to 2 wt. %, in particular from 0.1 wt. % to 1 wt. %, suds suppressors, the percentages by weight given each being based on the total agent.

Solvents which can be used in particular for liquid agents are, in addition to water, preferably those which are water-miscible. These include the lower alcohols, for example ethanol, propanol, isopropanol, and the isomeric butanols, glycerol, lower glycols, such as ethylene and propylene glycol, and the ethers derivable from said classes of compounds. In such liquid agents, the active ingredients used according to the invention are usually dissolved or in suspended form.

Optionally present enzymes are preferably selected from the group comprising protease, amylase, lipase, cellulase, hemicellulase, oxidase, peroxidase or mixtures thereof. First and foremost, proteases derived from microorganisms, such as bacteria or fungi, come into question. Protease can be obtained in a known manner by fermentation processes from suitable microorganisms. Proteases are commercially available, for example, under the names BLAP®, Savinase®, Esperase®, Maxatase®, Optimase®, Alcalase®, Durazym® or Maxapem®. The lipase which can be used can be obtained, for example, from *Humicola lanuginosa*, from *Bacillus* species, from *Pseudomonas* species, from *Fusarium* species, from *Rhizopus* species or from *Aspergillus* species. Suitable lipases are commercially available, for example, under the names Lipolase®, Lipozym®, Lipomax®, Lipex®, Amano®-Lipase, Toyo-Jozo®-Lipase, Meito®-Lipase and Diosynth®-Lipase. Suitable amylases are commercially available, for example, under the names Maxamyl®, Termamyl®, Duramyl® and Purafect® OxAm. The cellulase which can be used may be an enzyme which can be obtained from bacteria or fungi and has an optimum pH preferably in the slightly acidic to slightly alkaline range of from 6 to 9.5. Such cellulases are commercially available under the names Celluzyme®, Carezyme® and Ecostone®.

The conventional enzyme stabilizers that are optionally present in particular in liquid agents include amino alcohols, for example mono-, di-, triethanol- and -propanolamine and mixtures thereof, lower carboxylic acids, boric acid or alkali borates, boric acid-carboxylic acid combinations, boric acid esters, boronic acid derivatives, calcium salts, for example Ca-formic acid combination, magnesium salts, and/or sulfur-containing reducing agents.

Suitable suds suppressors include long-chain soaps, in particular behenic soap, fatty acid amides, paraffins, waxes, microcrystalline waxes, organopolysiloxanes and mixtures thereof, which moreover can contain microfine, optionally silanated or otherwise hydrophobized silicic acid. For use in particulate agents, such suds suppressors are preferably bound to granular, water-soluble carrier substances.

In a preferred embodiment, an agent in which active ingredient to be used according to the invention is incorporated is particulate and contains up to 25 wt. %, in particular from 4 wt. % to 20 wt. %, bleaching agent, in particular alkali percarbonate, up to 15 wt. %, in particular from 1 wt. % to 10 wt. %, bleach activator, from 20 wt. % to 55 wt. % inorganic builder, up to 10 wt. %, in particular from 2 wt. % to 8 wt. %, water-soluble organic builder, from 10 wt. % to 25 wt. % synthetic anionic surfactant, from 1 wt. % to 5 wt. % non-ionic surfactant and up to 25 wt. %, in particular from 0.1 wt. % to 25 wt. %, inorganic salts, in particular alkali carbonate and/or alkali hydrogen carbonate.

In a preferred embodiment, an agent in which active ingredient to be used according to the invention is incorporated is liquid and contains from 1 wt. % to 25 wt. %, in particular from 5 wt. % to 15 wt. %, non-ionic surfactant, up to 10 wt. %, in particular from 0.5 wt. % to 8 wt. %, synthetic anionic surfactant, from 3 wt. % to 15 wt. %, in particular from 5 wt. % to 10 wt. %, soap, from 0.5 wt. % to 5 wt. %, in particular from 1 wt. % to 4 wt. %, organic builder, in particular polycarboxylate such as citrate, up to 1.5 wt. %, in particular from 0.1 wt. % to 1 wt. %, complexing agent for heavy metals, such as phosphonate, and in addition to optionally contained enzyme, enzyme stabilizer, dye and/or fragrance, water and/or water-miscible solvent.

It is also possible to use a combination of an active ingredient which allows the removal of dirt and is essential to the invention having a polymer from a dicarboxylic acid which allows the removal of dirt and an optionally polymeric diol for increasing the cleaning performance of washing agents when washing textiles. Such combinations with an in particular polyester-active polymer which allows the removal of dirt are also possible within the context of agents according to the invention and the method according to the invention.

The known polyester-active polymers which allow the removal of dirt and which can be used in addition to the active ingredients of the invention include copolyesters of dicarboxylic acids, for example adipic acid, phthalic acid or terephthalic acid, diols, for example ethylene glycol or propylene glycol, and polydiols, for example polyethylene glycol or polypropylene glycol. Preferred polyesters which allow the removal of dirt include those compounds which are formally accessible by esterification of two monomeric moieties, the first monomer being a dicarboxylic acid HOOC-Ph-COOH and the second monomer being a diol $HO—(CHR^{11}—)_aOH$, which can also be present as polymeric diol $H—(O—(CHR^{11}—)_a)_bOH$. Here, Ph denotes an o-, m- or p-phenylene functional group which can carry 1 to 4 substituents selected from alkyl functional groups having 1 to 22 C atoms, sulfonic acid groups, carboxyl groups, and mixtures thereof, $R^{11}$ denotes hydrogen, an alkyl functional group having 1 to 22 C atoms and mixtures thereof, a denotes a number from 2 to 6 and b denotes a number from 1 to 300. Preferably, in the polyesters obtainable from these, both monomer diol units $—O—(CHR^{11}—)_aO—$ and also polymeric diol units $—(O—(CHR^{11}—)_a)_bO—$ are present. The molar ratio of monomer diol units to polymer diol units is preferably from 100:1 to 1:100, in particular 10:1 to 1:10. In the polymer diol units, the degree of polymerization b is preferably in the range of from 4 to 200, in particular from 12 to 140. The molecular weight or the average molecular weight or the maximum of the molecular weight distribution of preferred polyesters which allow the removal of dirt is in the range of from 250 g/mol to 100,000 g/mol, in particular from 500 g/mol to 50,000 g/mol. The acid underlying the functional group Ph is preferably selected from terephthalic acid, isophthalic acid, phthalic acid, trimellitic acid, mellitic acid, the isomers of sulfophthalic acid, sulfoisophthalic acid and sulfoterephthalic acid and mixtures thereof. If their acid groups are not part of the ester bonds in the polymer, they are preferably in salt form, in particular as alkali or ammonium salt. Among these, the sodium and potassium salts are particularly preferable. If desired, small proportions, in particular no more than 10 mol. % based on the proportion of Ph having the meaning given above, of other acids having at least two carboxyl groups may be present in the polyester which allows the removal of dirt instead of the monomer HOOC-Ph-COOH. These include, for example, alkylene and alkenylene dicarboxylic acids such as malonic acid, succinic acid, fumaric acid, maleic acid, glutaric acid, adipic acid, pimelic acid, suberic acid, azelaic acid and sebacic acid. Preferred diols $HO—(CHR^{11}—)_aOH$ include those in which $R^{11}$ is hydrogen and a is a number from 2 to 6, and those in which a has the value 2 and $R^{11}$ is selected from hydrogen and the alkyl functional groups having 1 to 10, in particular 1 to 3, C atoms. Among the last-mentioned diols, those of the formula $HO—CH_2—CHR^{11}—OH$ in which $R^{11}$ has the above-mentioned meaning are particularly preferred. Examples of diol components are ethylene glycol, 1,2-propylene glycol, 1,3-propylene glycol, 1,4-butanediol, 1,5-pentanediol, 1,6-hexanediol, 1,8-octanediol, 1,2-decanediol, 1,2-dodecanediol and neopentyl glycol. Particularly preferred from the polymeric diols is polyethylene glycol having an average molecular mass in the range of from 1,000 g/mol to 6,000 g/mol.

If desired, these polyesters composed as described above may also be end-capped, alkyl groups having 1 to 22 C atoms and esters of monocarboxylic acids being suitable as end groups. The end groups bonded via ester bonds can be based on alkyl, alkenyl and aryl monocarboxylic acids having 5 to 32 C atoms, in particular 5 to 18 C atoms. These include valeric acid, caproic acid, enanthic acid, caprylic acid, pelargonic acid, capric acid, undecanoic acid, undecenoic acid, lauric acid, lauroleinic acid, tridecanoic acid, myristic acid, myristoleic acid, pentadecanoic acid, palmitic acid, stearic acid, petroselic acid, petroselaidic acid, oleic acid, linoleic acid, linolaidic acid, linolenic acid, eleostearic acid, arachidic acid, gadoleic acid, arachidonic acid, behenic acid, erucic acid, brassic acid, clupanodonic acid, lignoceric acid, cerotic acid, melissic acid, benzoic acid, which may carry 1 to 5 substituents having a total of up to 25 C atoms, in particular 1 to 12 C atoms, for example tert-butylbenzoic acid. The end groups can also be based on hydroxymonocarboxylic acids having 5 to 22 C atoms, which include, for example, hydroxyvaleric acid, hydroxycaproic acid, ricinoleic acid, the hydrogenation product of which includes hydroxystearic acid and o-, m- and p-hydroxybenzoic acid. The hydroxymonocarboxylic acids may in turn be linked to one another via their hydroxyl group and their carboxyl group and thus be present several times in an end group. Preferably, the number of hydroxymonocarboxylic acid units per end group, i.e., their degree of oligomerization, is in the range of from 1 to 50, in particular from 1 to 10. In a preferred embodiment of the invention, polymers of ethylene terephthalate and polyethylene terephthalate, in which the polyethylene glycol units have molecular weights of from 750 to 5,000 and the molar ratio of ethylene terephthalate to polyethylene oxide terephthalate is 50:50 to 90:10, are used in combination with an active ingredient that is essential to the invention.

The polyester-active polymers which allow the removal of dirt are preferably water-soluble, the term "water-soluble" being understood to mean a solubility of at least 0.01 g, preferably at least 0.1 g, of the polymer per liter of water at room temperature and pH 8. However, polymers that are preferably used have a solubility of at least 1 g per liter, in particular at least 10 g per liter, under these conditions.

Preferred laundry post-treatment agents containing an active ingredient to be used according to the invention comprise, as a laundry-softening active ingredient, a so-called esterquat, i.e., a quaternized ester of carboxylic acid and amino alcohol. These are known substances which can be obtained by the relevant methods of preparative organic chemistry, for example by partially esterifying triethanolamine in the presence of hypophosphorous acid with fatty acids, passing air and then quaternizing with dimethyl sulfate or ethylene oxide. The preparation of solid esterquats is also known, in which the quaternization of triethanolamine esters is carried out in the presence of suitable dispersants, preferably fatty alcohols.

Esterquats preferred in the agents are quaternized fatty acid triethanolamine ester salts which follow formula (IV), (IV)

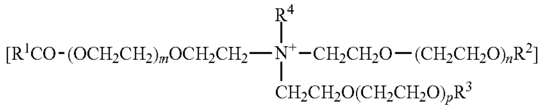

where $R^1CO$ represents an acyl functional group having 6 to 22 carbon atoms, $R^2$ and $R^3$ represent, independently of one another, hydrogen or $R^1CO$, $R^4$ represents an alkyl functional group having 1 to 4 carbon atoms or a $(CH_2CH_2O)_qH$ group, m, n and p in total represent 0 or numbers from 1 to 12, q represents numbers from 1 to 12 and X represents a charge-balancing anion such as halogenide, alkyl sulfate or alkyl phosphate. Typical examples of esterquats which can be used in the context of the invention are products based on caproic acid, caprylic acid, capric acid, lauric acid, myristic acid, palmitic acid, isostearic acid, stearic acid, oleic acid, elaidic acid, arachidic acid, behenic acid and erucic acid and their technical mixtures, such as those produced for example in the pressure cleavage of natural fats and oils. Technical $C_{12/18}$ coconut fatty acids and in particular partially hardened $C_{16/18}$ tallow or palm fatty acids and $C_{16/18}$ fatty acid sections rich in elaidic acid are preferably used. The fatty acids and the triethanolamine can generally be used in a molar ratio of from 1.1:1 to 3:1 in order to produce the quaternized esters. With regard to the practical properties of the esterquats, a use ratio of from 1.2:1 to 2.2:1, preferably 1.5:1 to 1.9:1, has been found to be particularly advantageous. The esterquats that are preferably used are technical mixtures of mono-, di- and triesters with an average degree of esterification of from 1.5 to 1.9 and are derived from technical $C_{16/18}$ tallow or palm fatty acid (iodine number 0 to 40). Quaternized fatty acid triethanolamine ester salts of the formula (IV), in which $R^1CO$ represents an acyl functional group having 16 to 18 carbon atoms, $R^2$ represents $R^1CO$, $R^3$ represents hydrogen, $R^4$ represents a methyl group, m, n and p represent 0 and X represents methyl sulfate, have been found to be particularly advantageous.

In addition to the quaternized carboxylic acid triethanolamine ester salts, quaternized ester salts of carboxylic acids with diethanolalkylamines of formula (V) are also suitable as esterquats, (V)

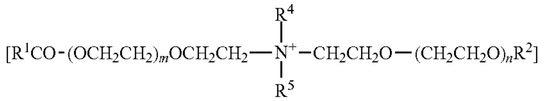

where $R^1CO$ represents an acyl functional group having 6 to 22 carbon atoms, $R^2$ represents hydrogen or $R^1CO$, $R^4$ and $R^5$ represent, independently of one another, alkyl functional groups having 1 to 4 carbon atoms, m and n in total represent 0 or numbers from 1 to 12 and X represents a charge-balancing anion such as halogenide, alkyl sulfate or alkyl phosphate.

Finally, the quaternized ester salts of carboxylic acids with 1,2-dihydroxypropyl dialkylamines of formula (VI) should be mentioned as a further group of suitable esterquats, (VI)

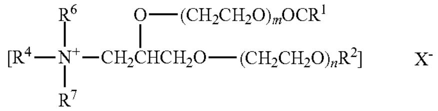

where $R^1CO$ represents an acyl functional group having 6 to 22 carbon atoms, $R^2$ represents hydrogen or $R^1CO$, $R^4$, $R^6$ and $R^7$ represent, independently of one another, alkyl functional groups having 1 to 4 carbon atoms, m and n in total represent 0 or numbers from 1 to 12 and X represents a charge-balancing anion such as halogenide, alkyl sulfate or alkyl phosphate.

With regard to the selection of the preferred fatty acids and the optimal degree of esterification, the exemplary specifications given for (IV) also apply analogously to the esterquats of formulas (V) and (VI). The esterquats are usually commercially available in the form of 50 to 90 wt. % alcoholic solutions which can also be easily diluted with water, with ethanol, propanol and isopropanol being the conventional alcoholic solvents.

Esterquats are preferably used in amounts of from 5 wt. % to 25 wt. %, in particular 8 wt. % to 20 wt. %, in each case based on the total laundry post-treatment agent. If desired, the laundry post-treatment agents used according to the invention can additionally contain washing agent ingredients listed above, provided that they do not interact negatively with the esterquat in an intolerable manner. A liquid, water-containing agent is preferred.

EXAMPLES

Example 1: Preparation of N-sulfoethyl chitosan 1.13 mL of concentrated hydrochloric acid (9.6 mmol) was added to a suspension of 25 g (155.3 mmol) of chitosan in 875 mL of water. The resulting mixture was stirred at room temperature for 10 minutes. 327.7 g (1.55 mol) of 2-bromoethanesulfonate (Na salt) was then added and the reaction mixture was stirred at 70° C. for 24 hours and then poured into 7 L of ethanol. After filtration (G3 frit), the solid residue was washed five times with 1 L ethanol each time. The product was then dried at 40° C. in vacuo.

DS: 0.52

Yield: 36.4 g

Elemental analysis: C % 35.38; H % 6.06; N % 5.52; S % 7.30

$^{13}C$ NMR (250 MHz, $D_2O$): δ (ppm)=98.4 (C-1); 77.45 (C-4); 75.22 (C-5); 71.07 (C-3); 62.8 (C-2s); 60.80 (C-6); 56.35 (C-2); 48.69 (N—$CH_2$—$CH_2$—S); 43.95 (N—$CH_2$—$CH_2$—S)

Example 2: Agent

Table 1 shows the composition (ingredients in percent by weight, in each case based on the entire agent) of the washing agent M1 according to the invention and the agent V1 free from a corresponding active ingredient and the agent V2 containing in its place an N,O-carboxymethyl chitosan (obtained according to Example 1a of WO 2019/243108 A1):

TABLE 1

| Composition | | | |
|---|---|---|---|
| | V1 | V2 | M1 |
| $C_{9-13}$ alkylbenzene sulfonate, Na salt | 9 | 9 | 9 |
| Sodium lauryl ether sulfate with 2 EO | 3 | 3 | 3 |
| $C_{12-14}$ fatty alcohol with 7 EO | 7 | 7 | 7 |
| $C_{12-18}$ fatty acid, Na salt | 2 | 2 | 2 |
| NaOH | 0.5 | 0.5 | 0.5 |
| Citric acid | 2 | 2 | 2 |
| 1-hydroxyethane-1,1-diphosphonate, Na salt | 0.6 | 0.6 | 0.6 |
| Cellulase | — | — | — |
| Other enzymes, dye, opt. brighteners, alcohols, boric acid, solvents | 14 | 14 | 14 |
| N,O-carboxymethyl chitosan | — | 1 | — |
| Active ingredient [a)] | — | — | 1 |
| Water | to make up to 100 | | |

[a)] N-sulfoethyl chitosan from Example 1

Example 3: Graying

Washing tests were carried out using the agents V1, V2 or M1 in a Miele® W 1935 washing machine (cotton washing program, short, 40° C.; water hardness 16° dH; standardized soil carrier; dosage 52.7 g of each agent per wash cycle). The materials listed in Table 2 (in each case 8 pieces of textile measuring 20 or 40×40 cm) and ready-made textiles were used in addition to filling laundry for a load of 3.5 kg.

Table 2 below shows the differences in the changes in brightness (ΔΔY values) of the materials after 5 washes under the specified conditions with agent M1 or agent V2 compared to the change in brightness after 5 washes with agent V1.

TABLE 2

| Difference in change in brightness | | |
|---|---|---|
| Textile/Agent | M1 | V2 |
| WFK 12A towel | 5.8 | 1.7 |
| Terry towel | 4.9 | 1.3 |
| EMPA 221 100% cotton | 1.4 | 0.4 |
| WFK 11A 1.1.13 | 2.4 | 0.2 |
| Double-rib cotton fabric | 2.6 | 1.9 |
| Viscose | 3.0 | 0.2 |
| 55% polyester/45% cotton | 3.8 | 0.8 |
| Anvil ® t-shirt | 4.5 | −0.4 |
| Barleycorn towel | 3.9 | 0.2 |
| Terry towel 100% cotton | 3.6 | 1.8 |

When using the agent M1 according to the invention, the materials gray significantly less than when using agent V2, which contains a known cleaning performance-enhancing active ingredient.

What is claimed is:

1. A washing agent or laundry post-treatment agent comprising a chitosan derivative having a modified anhydroglycoside unit of general formula (I), (I)

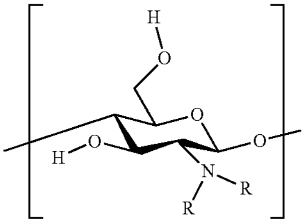

wherein:

the functional groups R are selected, independently of one another, from the group consisting of —H, —$(CH_2)_mSO_3H$ and —$(CH_2)_mSO_3^-X^+$, m represents a number from 1 to 3, $X^+$ represents a charge-balancing cation, at least one of the functional groups R is not —H, and the average degree of substitution in the chitosan derivative is from 0.1 to 1.0, based on the proportion of functional groups —$NR_2$ which are not —$NH_2$;

wherein the chitosan derivative is present in an amount of from 0.1 wt. % to 3 wt. %, based on the total weight of the washing agent or laundry post-treatment agent.

2. The washing agent or laundry post-treatment agent of claim 1, wherein $X^+$ represents a charge-balancing cation selected from the group consisting of an alkali metal ion and an ammonium ion.

3. The washing agent or laundry post-treatment agent of claim 1, wherein:

n represents 1 and m represents 2, and the average molecular weight of the chitosan derivative is from 5,000 g/mol to 150,000 g/mol.

4. The washing agent or laundry post-treatment agent of claim 1, wherein the degree of substitution in the chitosan derivative is from 0.2 to 0.9, based on the proportion of functional groups —$NR_2$, which are not —$NH_2$.

5. The washing agent or laundry post-treatment agent of claim 1, further comprising a peroxygen-based bleaching agent present in an amount of from 3 wt % to 70 wt %, based on the total weight of the washing agent or laundry post-treatment agent.

6. The washing agent or laundry post-treatment agent of claim 1, wherein the chitosan derivative is N-sulfoethyl chitosan.

7. The washing agent or laundry post-treatment agent of claim 1, wherein the chitosan derivative only has substituents on the N atom of the anhydroglucoside unit.

8. The washing agent or laundry post-treatment agent of claim 1, wherein the chitosan derivative comprises no further units than those of general formula (I).

9. The washing agent or laundry post-treatment agent of claim 1, further comprising an esterquat.

10. The washing agent or laundry post-treatment agent of claim 9, wherein:

the esterquat is a fatty acid triethanolamine ester salt having the structure of Formula (IV):

(IV)

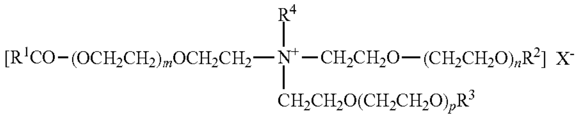

$R^1CO$ is an acyl functional group having 6 to 22 carbon atoms, $R^2$ and $R^3$, independently of one another, are a functional group selected from the group consisting of hydrogen or $R^1CO$, $R^4$ is a functional group selected from the group consisting of an alkyl functional group having 1 to 4 carbon atoms and $(CH_2CH_2O)_qH$, m, n, and p in total represent a number from 0 to 12, q represents a number from 1 to 12, and X is a charge-balancing anion.

11. A method for washing textiles, the method comprising:

contacting the textiles with a washing liquor comprising the washing agent or laundry post-treatment agent according to claim 1, the functional groups R are selected, independently of one another, from the group consisting of —H, $—(CH_2)_nCOOH$, $—(CH_2)_nCOO^-X^+$, $—(CH_2)_mSO_3H$, and $—(CH_2)_mSO_3^-X^+$, n and m represent, independently of one another, a number from 1 to 3, $X^+$ represents a charge-balancing cation, at least one of the functional groups R does not represent —H, and the average degree of substitution in the chitosan derivative is from 0.1 to 1.0, based on the proportion of function groups $—NR_2$ which are not $—NH_2$.

12. The method of claim 11, wherein the textiles have already been washed and/or post-treated in the presence of the washing agent or laundry post-treatment agent before they were soiled.

13. The method of claim 11, wherein the concentration of the chitosan derivative in the washing liquor is from 0.0001 g/l to 1 g/l.

14. The method of claim 13, wherein the concentration of the chitosan derivative in the washing liquor is from 0.001 g/l to 0.2 g/l.

15. The method of claim 11, wherein $X^+$ represents a charge-balancing cation selected from the group consisting of an alkali metal ion and an ammonium ion.

* * * * *